3,192,261
N,O-DICARBAMOYLHYDROXYLAMINES
Kathryn Alice Losee and Jack Bernstein, New Brunswick, N.J., assignors to Olin Mathieson Chemical Corporation, New York, N.Y., a corporation of Virginia
No Drawing. Filed July 29, 1963, Ser. No. 298,466
12 Claims. (Cl. 260—545)

This invention relates to dicarbamoylhydroxylamines of the formula (I) 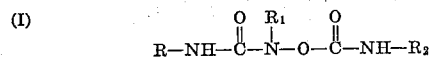

R, $R_1$ and $R_2$ in the above formula each represents hydrogen or alkyl, and preferably lower alkyl groups such as methyl, ethyl, propyl, isopropyl, butyl, isobutyl, t-butyl, amyl and the like.

The new compounds of this invention may be produced by one of the following methods. When R and $R_2$ are the same alkyl group, hydroxylamine or an N-alkyl hydroxylamine is reacted with an alkyl isocyanate, RN=C=O. When R and $R_2$ are different, an appropriately substituted hydroxyurea or O-carbamoylhydroxylamine is reacted with an alkyl isocyanate or cyanic acid. When R, $R_1$ and $R_2$ are all hydrogen, hydroxyurea is reacted with an alkali metal cyanate such as potassium cyanate.

The new compounds of Formula I are useful as antibacterial agents, e.g., to combat such organisms as *Proteus vulgaris* and *Pseudomonas aeruginosa*.

The following examples are illustrative of the invention. All temperatures are expressed in degrees centigrade.

EXAMPLE 1

*N,O-dicarbamoylhydroxylamine*

To a solution of 2.38 grams of hydroxyurea and 10 grams of potassium cyanate in 30 ml. of water, there is added 100 ml. of 0.5 N sulfuric acid, over a period of one hour, during which time the temperature of the reaction mixture is maintained at 5°. After two hours at room temperature, the reaction mixture is again cooled to 5° and 100 ml. of 0.5 N sulfuric acid added over a period of one hour. The solution is then deionized by treatment with ion-exchange resin. The filtrate from this treatment is lyophilized and recrystallized from absolute alcohol to give N,O-dicarbamoylhydroxylamine, melting at 158–160°.

EXAMPLE 2

*N,O-bis(methylcarbamoyl)hydroxylamine*

A mixture of 13.8 grams of hydroxylamine hydrochloride and 27.6 grams of potassium carbonate is intimately mixed in a mortar and then suspended in 60 ml. of ether containing 1% water. With vigorous stirring there is then added a solution of 11.4 g. of methyl isocyanate in 50 ml. of ether. After about 15 minutes a crystalline solid begins to precipitate in the reaction mixture, which is stirred for four hours at room temperature. The mixture is then filtered and the dry solid extracted with 100 ml. of absolute alcohol. The alcohol is then removed by distillation under reduced pressure. The solid residue is crystallized from acetonitrile to give the pure product, melting at 135–136° with decomposition.

EXAMPLE 3

*O-carbamoyl-N-methylcarbamoylhydroxylamine*

To a suspension of 1.52 g. of O-carbamoylhydroxylamine in 300 ml. of anhydrous ether at 35°, there is added with vigorous stirring a solution of 1.14 g. of methyl isocyanate in 10 ml. of anhydrous ether. An almost clear solution forms, and then a fine precipitate forms in the reaction mixture. The reaction mixture is stirred overnight at room temperature and is then filtered to yield the product which is recrystallized from absolute alcohol, melting at 129–131°.

EXAMPLE 4

*N,O-bis(ethylcarbamoyl)-N-methylhydroxylamine*

Following the procedure of Example 2 but substituting 16.6 grams of N-methylhydroxylamine hydrochloride for the hydroxylamine hydrochloride and 14.2 grams of ethyl isocyanate for the methyl isocyanate, there is obtained N,O-bis(ethylcarbamoyl)-N-methylhydroxylamine.

EXAMPLE 5

*O-n-butylcarbamoyl-N-carbamoylhydroxylamine*

To a solution of 7.6 grams of hydroxyurea in dimethylacetamide there is added dropwise 9.9 grams of n-butyl isocyanate. There is an exothermic reaction and the temperature of the reaction mixture rises from 26° to 48°. The reaction mixture is then stirred for one hour to complete the reaction and the product recovered by removal of the dimethylacetamide under reduced pressure.

EXAMPLE 6

*O-n-butylcarbamoyl-N-carbamoyl-N-ethylhydroxylamine*

Following the procedure of Example 5 but substituting 10.4 grams of 1-ethyl-1-hydroxyurea for the hydroxyurea there is obtained O-n-butylcarbamoyl-N-carbamoyl-N-ethylhydroxylamine.

EXAMPLE 7

*O-n-butylcarbamoyl-N-ethylcarbamoyl-N-methylhydroxylamine*

Following the procedure of Example 5 but substituting 11.8 grams of 1-methyl-3-ethyl-1-hydroxyurea there is obtained O-n-butylcarbamoyl-N-ethylcarbamoyl-N-methylhydroxylamine.

EXAMPLE 8

*N,O-dicarbamoyl-N-methylhydroxylamine*

Following the procedure of Example 1 but substituting 2.7 grams of 1-methyl-1-hydroxyurea for the hydroxyurea, there is obtained N,O-dicarbamoyl-N-methylhydroxylamine.

EXAMPLE 9

*N-methylcarbamoyl-O-carbamoyl-N-methylhydroxylamine*

Following the procedure of Example 1 but substituting 3.12 grams of 1,3-dimethyl-1-hydroxyurea for the hydroxyurea there is obtained N-methylcarbamoyl-O-carbamoyl-N-methylhydroxylamine.

What is claimed is:
1. A compound of the formula

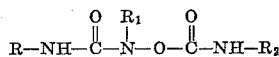

wherein R, $R_1$ and $R_2$ is each a member of the group consisting of hydrogen and lower alkyl.

2. A compound of the formula

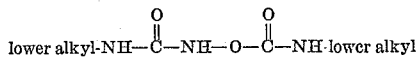

3. A compound of the formula

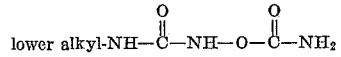

4. A compound of the formula

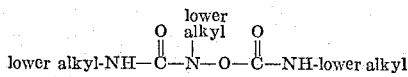

5. A compound of the formula

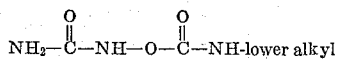

6. A compound of the formula

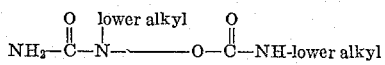

7. A compound of the formula

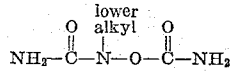

8. N,O-dicarbamoylhydroxylamine.
9. N,O-bis(methylcarbamoyl)hydroxylamine.
10. O-carbamoyl-N-methylcarbamoylhydroxylamine.
11. N,O-bis(ethylcarbamoyl)-N-methylhydroxylamine.
12. O-n-butylcarbamoyl-N-carbamoylhydroxylamine.

References Cited by the Examiner

Taylor et al.: Organic Chemistry of Nitrogen (1937), pages 288–9.

NICHOLAS S. RIZZO, *Primary Examiner.*

J. D. RANDOLPH, *Examiner.*